Jan. 2, 1962     J. W. TOENSING     3,015,236
DRIVE MECHANISM WITH CONTINUOUS INPUT AND INTERMITTENT OUTPUT
Filed March 14, 1960     2 Sheets-Sheet 1
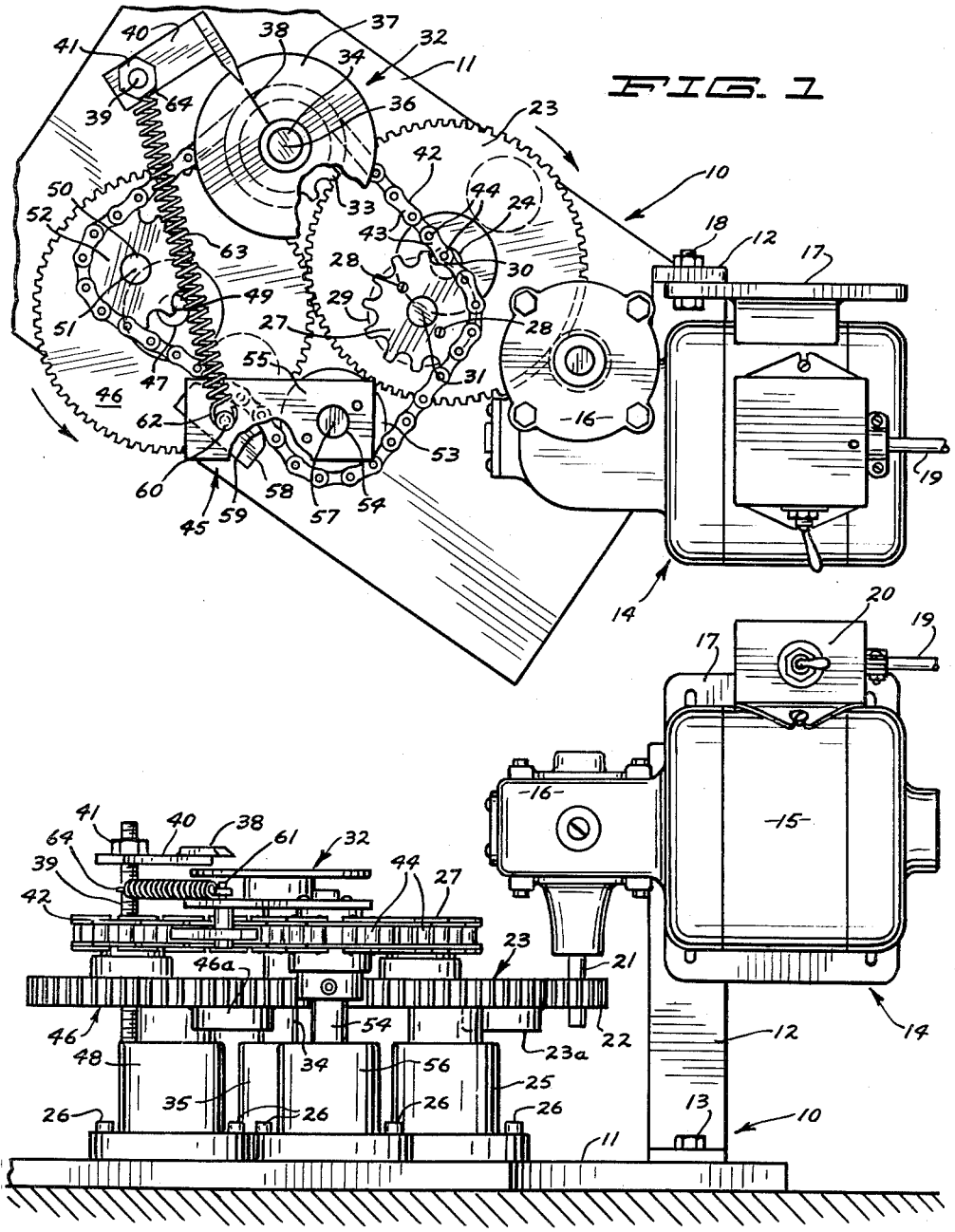
INVENTOR.
JAMES W. TOENSING
BY
ATTORNEY

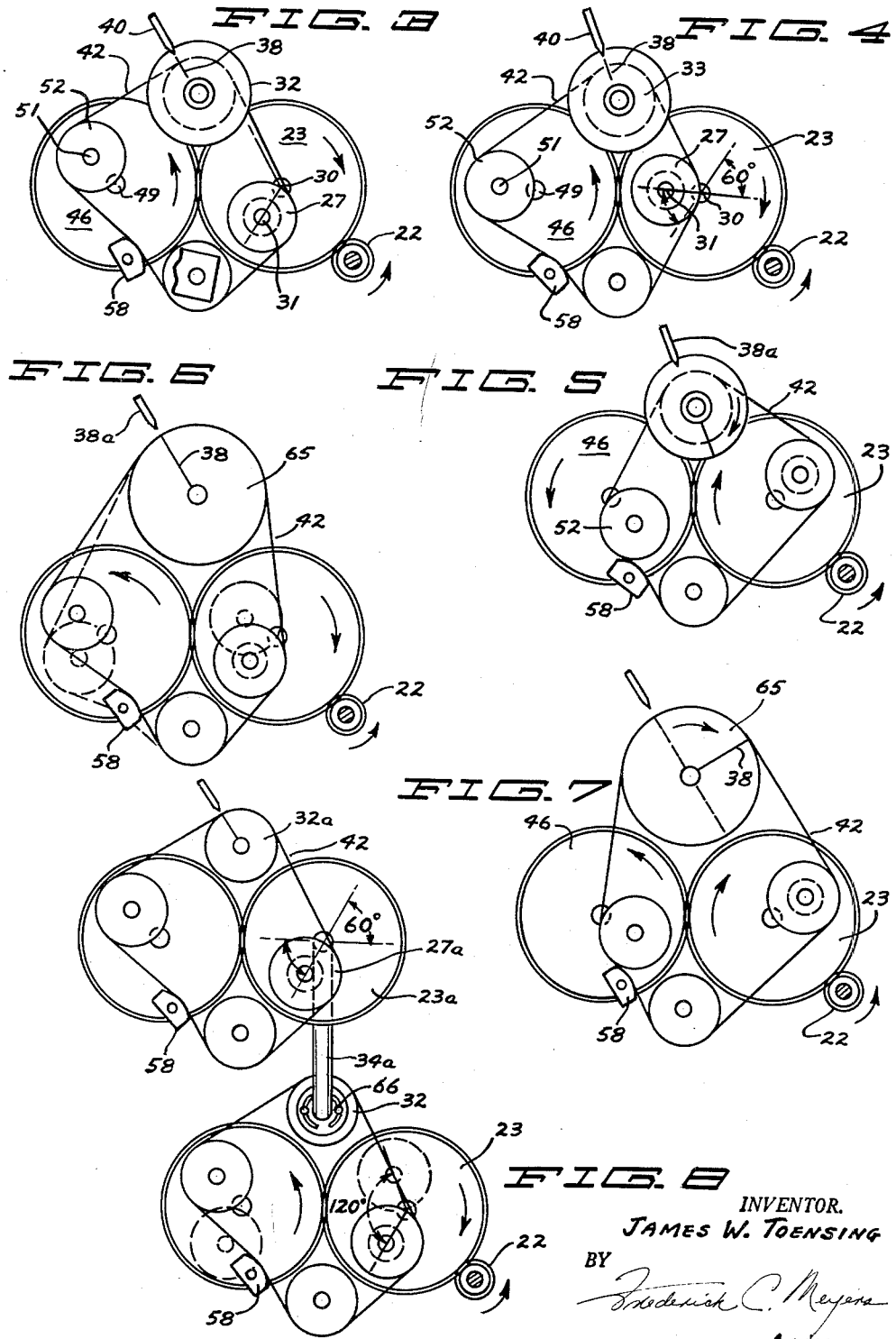

United States Patent Office 3,015,236
Patented Jan. 2, 1962

3,015,236
DRIVE MECHANISM WITH CONTINUOUS INPUT
AND INTERMITTENT OUTPUT
James W. Toensing, Minneapolis, Minn., assignor to
Remmele Engineering, Inc., St. Paul, Minn., a corporation of Minnesota
Filed Mar. 14, 1960, Ser. No. 14,654
10 Claims. (Cl. 74—84)

This invention relates to the transmission of motion and more particularly to a drive mechanism having a continuous input motion and an intermittent output motion.

It is an object of the invention to provide a drive mechanism of the class described which is simple and inexpensive to manufacture and operate.

Another object is to provide a drive which is versatile in nature and which can be driven at a variety of speeds to produce cyclic intermittent output motion with a portion of each cycle constituting a dwell period.

A further object of the invention is to provide intermittent drive mechanism of compact character wherein the elements mainly comprise conventional gears, sprockets and drive chain related in a novel manner.

A still further object is to provide an intermittent endless roller chain drive apparatus which has a positively driven compensating member to take up automatically the greater portion of the variation in length of the roller chain drive so as to minimize the amount of slack take up required during each cycle of operation.

Still another object of the invention is to provide intermittent drive mechanism which will be highly accurate and yield a soft and smooth acceleration and deceleration from and toward the dwell position of the output drive.

These and other objects and advantages of the invention will more fully appear from the following description, made in connection with the accompanying drawings, wherein like reference characters refer to the same parts throughout the several views and in which:

FIGURE 1 is a top plan view of my intermittent drive mechanism;

FIGURE 2 is a side elevation of the device;

FIGURE 3 is a diagrammatically represented relationship of the gears, sprockets and roller chain taken at the beginning of a dwell period;

FIGURE 4 is a view similar to that of FIGURE 3 showing the position of the elements at the end of a dwell period;

FIGURE 5 is a view similar to that of FIGURE 3, showing the position of the elements intermediate the beginning and end of the drive cycle;

FIGURE 6 is a diagrammatic representation of an alternate form of the invention wherein the intermediate output drive diameter has been doubled and the position shown in full line is the beginning of the dwell period and the dotted line position is the end of the dwell period;

FIGURE 7 is a view similar to the alternate form of FIGURE 6, showing the position of the elements intermediate the beginning an end of the drive cycle, the dotted line radiuses indicating two dwell positions for a single output cycle; and FIGURE 8 is a diagrammatic representation of a further modification wherein the intermittent output is coupled with a second mechanism to gain further flexibility at the intermittent output drive.

With continued reference to the drawings, and particularly to FIGS. 1 and 2, I provide a mounting structure 10 which has a base plate 11 and a standard 12 for positioning the elements of my drive as will be hereinafter disclosed. In the form shown, standard 12 is conveniently secured to the base plates 11 by such means as bolt 13.

Secured to standard 12 is a prime mover 14 which, in turn, may utilize an electric motor 15 with a gear box 16 as shown. Motor 15 is secured to standard 12 at its base 17 by means of threaded fasteners 18. Motor 15 may be energized through electrical cord 19 and switch 20. Gear box 16 may be formed integrally with motor 15 as is common in the art and provided with shaft 21 to which a pinion gear 22 is secured.

An input drive element such as the gear 23 lies in intermeshed engagement with the pinion 22 and may be provided with a stub shaft 24 journaled in the bearing 25 as shown in FIGS. 1 and 2. Bearing 25 is secured to base plate 11 by means such as bolts 26 so that the axis of shaft 24 will be fixed with respect to the base and mounting structure 10.

A sprocket 27 is rigidly secured to the face of gear 23 by such means as bolts 28 in such a manner that the plane of the sprockets lies slightly above and in parallel relation to the face of gear 23. The effective circumference of sprocket 27 is shown at 29 and precisely intersects the projected axis 30 of the stub shaft 24 centrally of gear 23. Thus, the axis 31 of sprocket 29 lies in eccentric relation to that of gear 23 and rotates with the gear 23 about the axis 24, the latter being fixed with respect to the mounting structure 10. A counterweight 23a may be conveniently secured to the underside of gear 23 so as to assist in dynamically balancing the input gear member.

An output member 32 is provided with the sprocket 33 having a stub shaft 34 which, in turn, is journaled in bearing 35 secured to base plate 11 so that the axis 36 of shaft 34 will lie in fixed and spaced parallel relation with axis 30 of the gear 23. Sprocket 33 lies in the same plane as that of sprocket 27 and may be secured to shaft 34 so that it rotates with the sprocket.

An indicating disc 37 may also be secured to shaft 34 and provided with radial marking means 38 to demonstrate the behavior of the output member 32 during each cycle of operation. A pointer element 39 may be fixedly secured to base 11 to demonstrate the relative position of the disc 37 and its radial mark 38. The pointer element 39 includes a standard to which a pointer arm 40 is secured by a threaded fastener 41, as shown in FIGS. 1 and 2. While the disc 37 is shown for illustrative purposes, the output member can, of course, include any of a multiplicity of devices which are intended to be intermittently driven whether mounted upon shaft 34 or driven indirectly therethrough.

The element through which intermittent motion is transmitted to the output member 32 includes a flexible endless driving belt or chain 42 which may be provided with conventional links 43 and roller elements 44, as shown in FIGS. 1 and 2. The links of the flexible roller chain are such as to permit give and take in slack existing in a portion extending beyond sprockets 37 and 27. A means for keeping the roller chain taut is indicated generally at 45 and includes a compensator gear 46 and a slack take-up which will be subsequently described, the means 45 cooperatively maintaining the roller chain 42 in taut condition irrespective of wear which may take place in the roller chain over a length of time. The gear 46 is intermeshed with gear 23 and may be conveniently of the same diameter so as to produce a 1:1 gear ratio with gear 46 rotating in the opposite direction from gear 23. Gear 46 has a stub shaft 47 secured centrally thereof, which shaft is rotatively received in bearing 48, which, in turn, may be secured to base plate 11 by such means as the bolts 26. The axis 49 of gear 46 is fixed with respect to the mounting structure 10 and lies in spaced relation with the axis 36 of output member 32 and axis 30 of the input drive element 23. Secured eccentrically to gear 46 is a stub shaft 50 having an axis 51 in spaced parallel relation to the axis 49, and axis 51 may be conveniently spaced the same radial distance outwardly on gear 46 as axis 31 of sprocket 27 is spaced outwardly of the axis of input drive element 23. A sprocket 52 lies in the same plane with sprocket 27 and sprocket 33 and is freely rotatable upon the stub shaft 50. A counterweight 46a may be secured to the underside of gear 46 to assist in dynamically balancing the gear 46 and its associated sprocket 52.

An idler wheel or roller 53 also lies in the same plane with the previously mentioned sprockets 27, 33 and 52 and is rotatively secured to stub shaft 54 which, in turn, is secured to rocker arm 55 extending radially outward from shaft 54. The shaft 54 is journaled for oscillation in the bearing 56, the latter being secured to the mounting structure by bolts 26. Since the idler roller 53 can rotate independently of shaft 54, rocker arm 55 can seek any radial position while the roller 53 lies in idling contact with the roller chain 42. Idler roller 53 rotates about an axis 57 which is fixed with with respect to the mounting structure 10.

Also forming a part of the means for keeping chain 42 taut is a slack take-up block 58 having a slide surface 59 lying in contact with the outer periphery of chain 42. Block 58 is pivotally mounted at 60 to the rocker arm 55 and pivot 60 has a portion 61 extending above the rocker arm 55 to which an end 62 of spring 63 is secured. The other end 64 of spring 63 is attached to the standard 39 which holds the pointer 38 as previously described.

In the operation of my intermittent motion device, the prime mover 14 transmits a constant rotary motion through pinion 22 to the input drive element 23 causing it to rotate in a clockwise direction as viewed in FIGURE 1. Referring now to the diagrammatic representations of FIGS. 3, 4 and 5, the input drive element 23 causes the sprocket 27 to rotate eccentrically with respect to the axis 30 and since sprocket 27 is rigidly secured to the gear 23, it will make one revolution for each revolution of the gear 23. At the full line position of FIG. 3, the sprocket 27 is just beginning a dwell period wherein a chain roller 44 becomes aligned with axis 30. This aligned roller 44 remains at the axially aligned position for the length of time that it takes the sprocket 27 to engage the next roller 44 of chain 42, following which the roller chain 42 is moved from any position where a roller 44 can again coincide with axis 30 of gear 23 until a complete revolution of the gear has been effected. Thus, the roller chain 42 remains motionless at that portion of its stretch which lies between the output member 32 and the input sprocket 27 until the gear 27 has traversed an arc of approximately 60° in the instant case. Where it is desired to hold chain 42 and output member 32 absolutely motionless, a somewhat smaller effective arc is employed, bearing in mind that the axially aligned roller 44 will begin to move away from axis 30 when the sprocket 27 reaches the position shown in FIG. 4. Radial mark 38 remains in alignment with the pointer 40 during the dwell period but as the gear 23 continues to rotate from the position of FIG. 4 to that of FIG. 5, chain 42 will be caused to advance in accelerated manner and will reach a maximum speed at approximately the position shown in FIG. 5. Roller chain 42 then decelerates until the sprocket 27 again reaches the beginning of its dwell period as shown in FIG. 3. A characteristic of the intermittent drive is the lack of shock starting and stopping which is characteristic of many types of intermittent drives such as that employing the well known "Geneva" drive.

Since the compensator gear 46 is intermeshed with gear 23 and has a 1:1 ratio therewith, the sprocket 52 will also make one revolution while sprocket 27 makes its revolution. However, since the direction of rotation of the compensator gear 46 is opposite that of gear 23, the sprocket 52 will be in its uppermost position while the sprocket 27 is in its lowermost position as viewed in FIG. 3. During the dwell period, axis 51 and axis 31 will be approximately aligned with the respective axes 49 and 30 of gears 46 and 23. This arrangement minimizes the elongation and shortening of roller chain 42 and, as a consequence, the take-up slack block 58 need move only a short distance toward and away from a line intersecting axis 51 and axis 57 of the respective compensator sprocket 52 and idler roller 53. Since considerable mechanical advantage is gained through pressure against the stretch of roller chain 42 lying between idler roller 53 and sprocket 52, the spring is comparatively weak and yet effectively can maintain the roller chain 42 in precise taut condition.

Referring now to FIG. 6, the same general relationship of elements is there disclosed excepting the size of the output sprocket 33. As shown in FIG. 6, the output sprocket 65 has twice the diameter of the output sprocket 33 as shown in FIGS. 1 through 5. The larger output sprocket 65 causes mark 38 to indicate a dwell period with pointer 40 both in the position shown in FIG. 6 and in the diametrically opposed position illustrated in dotted line in FIG. 7. Also, two maximum speed positions will occur during each cycle, one of them being indicated by the position of the output sprocket 65 in FIG. 7 and the other being in approximately opposed relation when the output sprocket 65 has rotated approximately 180°. It will be noted that each complete cycle of the output sprocket 65 includes two dwell periods and two motion periods.

Referring now to FIG. 8, additional versatility may be gained in my intermittent motion mechanism by utilizing the output shaft 34 as the initial drive for a second duplicate drive wherein the input gear is designated 23a, input sprocket 27a, output sprocket 33a. The output shaft 34a may be rotatably fixed with respect to the output member 32 by means of adjustment member 66 and with this arrangement the natural dwell arc of the input drive 23a can be added to that of the input drive 23 so that output member 32a can be maintained in stopped condition through approximately 120° of dwell in the rotation of the input gear 23. It will be obvious that other combinations of starting, stopping, accelerating and decelerating can be obtained by adjusting the relative position of output shaft 34a with respect to output shaft 32.

It will be observed that my mechanism for producing intermittent motion employs parts which rotate smoothly with respect to associated axes with the exception of the take-up mechanism however the arrangement is such that the reciprocation of the take-up block is slight and the mass of the parts associated therewith is comparatively light as opposed to the large mass of reciprocating cranks and similar mechanisms commonly employed heretofore in producing intermittent motion. Because of the smooth running characteristics of my intermittent motion mechanism I can operate the apparatus at high speeds without vibration. Further, the parts are so interrelated as not to produce high stresses at any particular location and hence wear and breakage is reduced to a minimum.

It will, of course, be understood that various changes may be made in the form, details, arrangements and proportions of the parts without department from the scope of my invention as set forth in the appended claims.

What I claim is:

1. In a mechanism for producing intermittent rotary motion, a constant speed input drive element mounted for rotation upon a fixed axis, a sprocket rigidly secured in parallel relation to said input drive element and having its effective circumference precisely intersecting the projected axis of said input drive element, an intermittently rotated output member having a sprocket mounted for rotation upon a fixed axis lying in spaced parallel relation to that of said input drive element, a flexible endless driving chain trained about said sprockets, and means in engagement with said flexible endless drive chain for maintaining the latter in taut condition.

2. In a mechanism for producing intermittent rotary motion, a constant speed input drive element mounted for rotation upon a fixed axis, a sprocket rigidly secured in parallel relation to said input drive element and having its effective circumference precisely intersecting the projected axis of said input drive element, an intermittently rotated output member having a sprocket mounted for rotation upon a fixed axis lying in spaced parallel relation to that of said input drive element, a flexible endless driving chain trained about said sprockets, and a sprocket rotatable on its own axis driven by said flexible endless driving chain eccentrically rotatable with respect to a fixed axis lying in spaced parallel relation with the axes of both of said input drive element and said output member.

3. In a mechanism for producing intermittent rotary motion, a constant speed input drive element mounted for rotation upon a fixed axis, a sprocket rigidly secured in parallel relation to said input drive element and having its effective circumference precisely intersecting the projected axis of said input drive element, an intermittently rotated output member having a sprocket mounted for rotation upon a fixed axis lying in spaced parallel relation to that of said input drive element, a flexible endless driving chain trained about said sprockets, a compensator gear rotatable upon a fixed axis lying in spaced parallel relation with the axes of both of said input drive element and said output member, and a sprocket rotatably mounted on said compensator gear and having said flexible endless drive chain trained thereabout in timed relation with the first mentioned sprockets.

4. In a mechanism for producing intermittent rotary motion, a constant speed input drive element mounted for rotation upon a fixed axis, a sprocket rigidly secured in parallel relation to said input drive element and having its effective circumference precisely intersecting the projected axis of said input drive element, an intermittently rotated output member having a sprocket mounted for rotation upon a fixed axis lying in spaced parallel relation to that of said input drive element, a flexible endless driving chain trained about said sprockets, a compensator gear rotatable upon a fixed axis lying in spaced parallel relation with the axes of both of said input drive element and said output member, said compensator gear being driven by said input drive element and having a 1:1 gear ratio therewith, and a sprocket rotatably mounted upon said compensator gear eccentrically with respect to the axis thereof and having said flexible endless driving chain trained thereabout in timed relation with the sprockets associated with said input drive element and said output member.

5. A mechanism for producing non-uniform motion which comprises, a mounting structure, an input drive gear rotatably mounted on an axis fixed with respect to said mounting structure, a prime mover in driving engagement with said drive gear, a compensator gear intermeshed with said drive gear, a sprocket rigidly secured in eccentric relation to said drive gear, a sprocket rotatably mounted on an axis fixed with respect to said compensator gear and lying in the same plane as the rigidly secured sprocket, an intermittent output sprocket rotatably mounted on an axis fixed with respect to said mounting structure, and an endless flexible drive chain trained about all of said sprockets, whereby upon imparting uniform rotation from the prime mover to said drive gear, compensated non-uniform rotary motion will be imparted to said output sprocket.

6. A mechanism for producing an intermittent motion output from a constant motion input which comprises, a mounting structure, an input drive gear rotatably mounted on an axis fixed with respect to said mounting structure, a prime mover adapted to drive said drive gear, a compensator gear intermeshed with said drive gear and having a 1:1 gear ratio therewith, a sprocket rigidly secured to said drive gear and having a toothed circumference lying in a plane parallel to that of said drive gear and effectively intersecting the projected axis of said drive gear, a sprocket rotatably mounted on an axis eccentric with respect to that of said compensator gear and having the same diameter as the sprocket associated with said input drive gear, an intermittent output sprocket rotatably mounted on an axis fixed with respect to said mounting structure, and an endless flexible drive chain trained about all of said sprockets, the axes of the input drive gear, the compensator gear and each of the sprockets associated therewith all coming substantially into the same plane during the dwell period of the intermittent output sprocket.

7. A mechanism for producing an intermittent motion output from a constant motion input which comprises, a mounting structure, an input drive gear rotatably mounted on an axis fixed with respect to said mounting structure, a prime mover adapted to drive said drive gear, a compensator gear intermeshed with said drive gear and having a 1:1 gear ratio therewith, a sprocket rigidly secured to said drive gear and having a toothed circumference lying in a plane parallel to that of said drive gear and effectively intersecting the projected axis of said drive gear, a sprocket rotatably mounted on an axis fixed with respect to said compensator gear and lying in the same plane as the rigidly secured sprocket, an intermittent output sprocket rotatably mounted on an axis fixed with respect to said mounting structure, an endless flexible drive chain trained about all of said sprockets, and a slack take-up block resiliently in engagement with said flexible drive chain for taking up the residual slack not fully compensated for by said compensator gear and sprocket, whereby upon imparting constant rotation from the prime mover to said drive gear, an intermittent rotary motion will be imparted to said output sprocket.

8. In a mechanism for producing intermittent rotary motion, a constant speed input drive element mounted for rotation upon a fixed axis, a sprocket rigidly secured in parallel relation to said input drive element and having its effective circumference precisely intersecting the projected axis of said input drive element, an intermittently rotated output shaft having a sprocket mounted for rotation on a fixed axis lying in spaced parallel relation to that of said input drive element, a flexible endless driving chain trained about said sprockets, means in engagement with said flexible endless driving chain for maintaining the latter in taut condition, a second drive element mounted upon said output shaft and having a sprocket rigidly secured thereto in parallel relation therewith and having its effective circumference precisely intersecting the projected axis of said second drive element, a second intermittently rotated output member having a sprocket mounted for rotation upon a fixed axis lying in spaced parallel relation to that of said second drive element, a second flexible endless driving chain trained about the sprockets associated with said second drive element and said second output member, and means in engagement with said second flexible drive chain for maintaining the latter in taut condition.

9. The mechanism set forth in claim 8 have means adjustably fixing the relative rotary position of said second drive element with respect to said output shaft.

10. In a mechanism for producing intermittent rotary motion, a constant speed input drive element mounted for rotation upon a fixed axis, a sprocket rigidly secured in parallel relation to said input drive element and having its effective circumference precisely intersecting the projected axis of said input drive element, an intermittently rotated output member having a sprocket mounted for rotation upon a fixed axis lying in spaced parallel relation to that of said input drive element, a flexible endless roller chain trained about said sprockets, said sprocket secured to said input drive element being so constructed and arranged as to cause a roller of said roller chain to come into axial alignment with said input drive element for a portion of each revolution of the input drive element to define an absolute dwell period therein, and means in engagement with said roller chain for maintaining the latter in taut condition.

References Cited in the file of this patent

UNITED STATES PATENTS 2,858,719    Hautau _____ Nov. 4, 1958

FOREIGN PATENTS 782,206    Great Britain _____ Sept. 4, 1957